Feb. 27, 1923.

R. H. JAMES 1,447,022

CUTTING DEVICE

Filed May 26, 1921

R. H. JAMES

1,447,022

CUTTING DEVICE

Filed May 26, 1921  8 sheets-sheet 4

Feb. 27, 1923.
R. H. JAMES
CUTTING DEVICE
Filed May 26, 1921

Witnesses
Geo. A. Gruss
Augustus B. Copper

Inventor
R. Heber James
By Joshua R. H. Potts
his Attorney

Patented Feb. 27, 1923.

1,447,022

UNITED STATES PATENT OFFICE.

REGINALD HEBER JAMES, OF PHILADELPHIA, PENNSYLVANIA.

CUTTING DEVICE.

Application filed May 26, 1921. Serial No. 472,773.

*To all whom it may concern:*

Be it known that I, REGINALD HEBER JAMES, a citizen of the United States, residing at Philadelphia, in the county of Philadelphia and State of Pennsylvania, have invented certain new and useful Improvements in Cutting Devices, of which the following is a specification.

It is necessary at times to attach structures to piles at positions below the water level; the piles being first cut to provide recesses and shoulders to which the ends of beams or other structures are secured. This cutting of the piles at portions submerged in the water has always been a slow and tedious operation and could not be done accurately prior to my present invention especially where a number of piles had to be cut.

One object of my present invention is to provide a device which can be conveniently and quickly used for accurately cutting shoulders and recesses in piles at positions below the water level.

Another object is to make the device of my invention of a strong and durable construction.

These objects, and other advantageous ends which will be described hereinafter, I attain in the following manner, reference being had to the accompanying drawings in which Figure 16 is a fragmentary top plan view partly in section showing the controlling cam for the automatic mechanism in its relation to the driving clutches, Figures 17 and 18 are respectively a side elevation and top plan view of one of the clutch-throwing arms as shown in Figure 7, Figures 19 and 20 are respectively a side elevation and top plan view of another of the clutch-throwing arms shown in Figure 7, Figure 23 is a perspective view, partly broken away, of said switch, Figures 24 and 25 are perspective views of certain of the switch elements, Figure 30 is a fragmentary elevation looking in the direction of the arrow $y$ in Figure 9, Figure 31 is a section taken on the line 31—31 of Figure 30, Figure 34 is a fragmentary elevation showing a means of hand control of the cutting means which can be used in lieu of the automatic controlling means if so desired.

Figure 1:
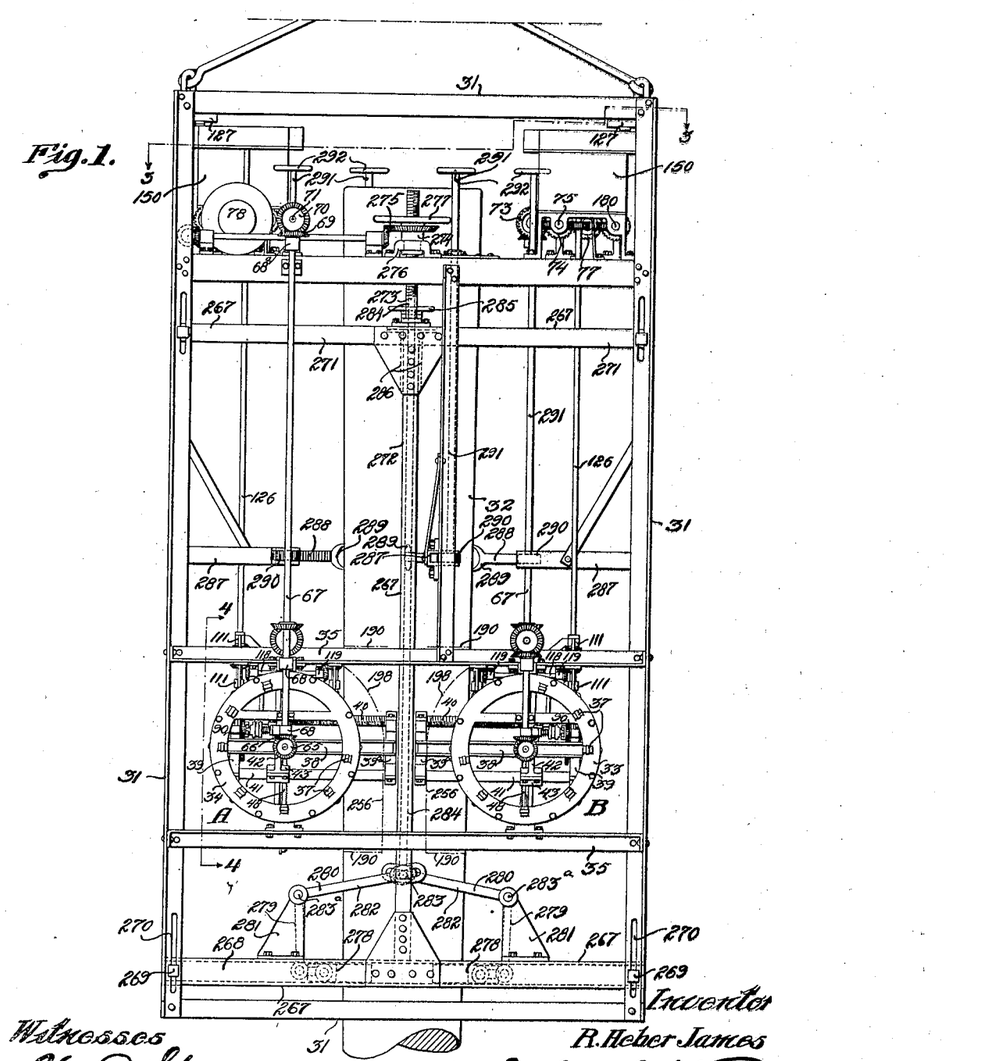
Figure 1 is a front elevation of my invention showing the same positioned relatively to a pile and illustrating the parts in the positions which they assume in beginning or ending a cut of the pile.
Figures 2, 33:
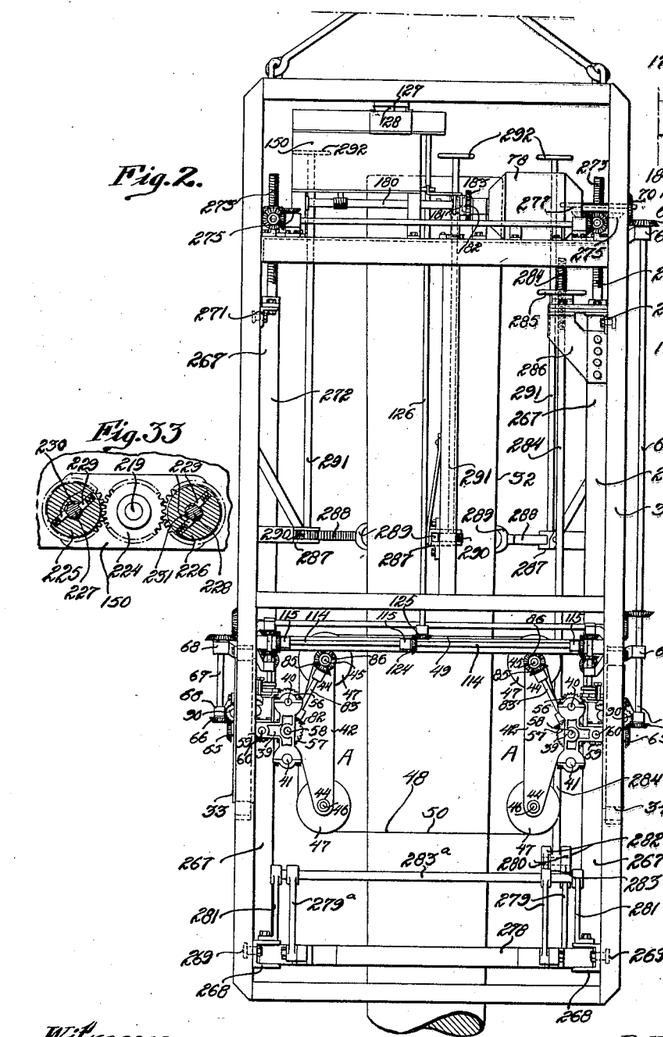
Figure 2 is an elevation of the side of the structure shown in Figure 1 looking in either direction.
Figure 33 is a fragmentary section taken on the line 33—33 of Figure 10.
Figure 3:
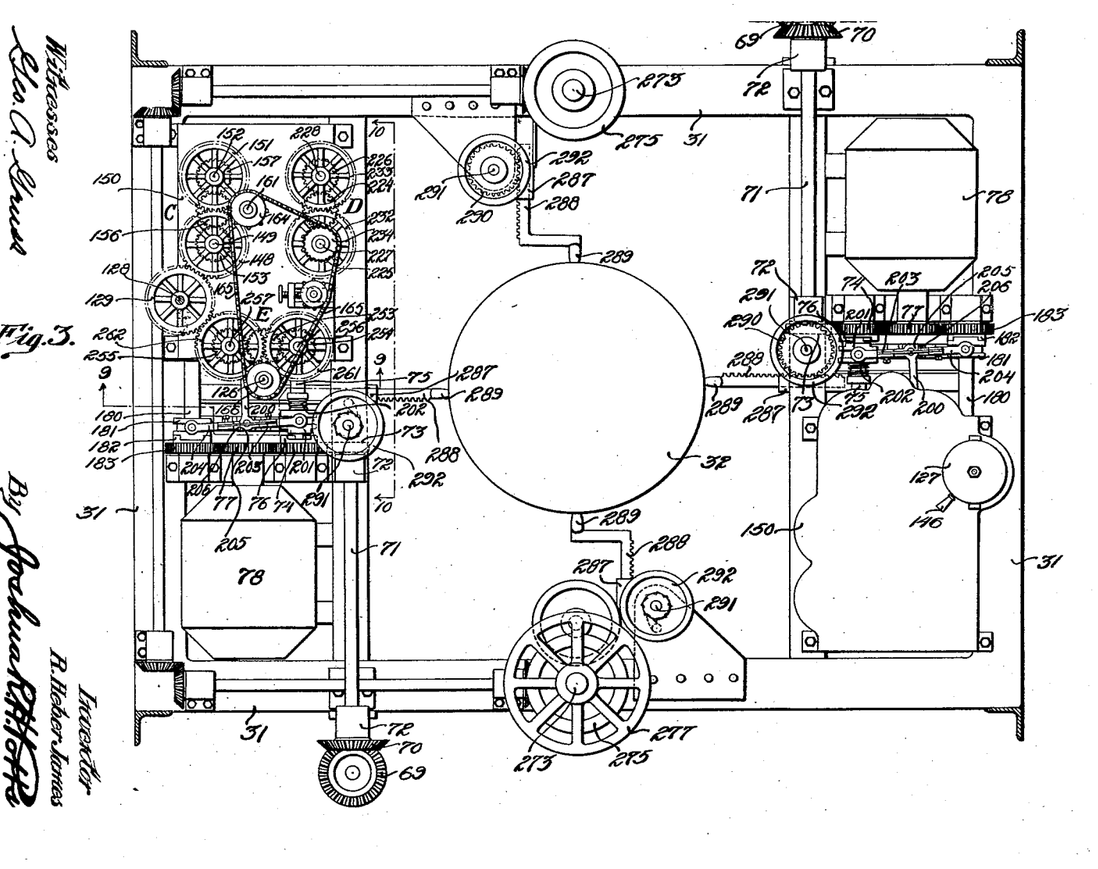
Figure 3 is a sectional top plan view taken on the line 3—3 of Figure 1.

Referring to the drawings and particularly to Figures 1 to 33 inclusive, my improved device includes a frame 31 in the form of a cage which may be suspended by cables and lowered over a pile in which it is desired to cut recesses and shoulders and thereby permit the attachment of beams or other supporting means to the pile. Figures 1, 2 and 3 show the frame having been lowered over a pile 32 and it will be considered that the portion of the pile to be cut is below the water level so that a part of the frame 31 will be lowered into the water. The device, as shown, is provided with cutting units A and B for cutting recesses or notches in the pile 32 at positions diametrically opposite each other and since these units including their operating and controlling means are similarly constructed and can operate independently of each other, it will be necessary to describe only one of these units in detail and it will be understood that the other unit is similarly constructed and controlled. However, I prefer to provide the device with two of the units as illustrated so that cuts on both sides of the pile can be done simultaneously if desired. The unit A includes two circular carrier housings 33 and 34 which are similarly constructed; the detail of construction being clearly shown in Figures 4 and 5; said carrier housings being in axial alignment and secured to portions 35 of the cage 31. Carrier rings 36 are rotatably mounted within the housings 33 and 34; said housings having anti-friction rollers 37 for engagement with the peripheral surfaces of the carrier rings to permit said rings to rotate therein with a minimum amount of friction. Each of the carrier rings 36 has a transverse brace 38, as shown in Figure 5, from which projects bearing brackets 39 and 39$^a$; said bearing brackets at opposite sides of the unit projecting toward each other.

Figure 6:
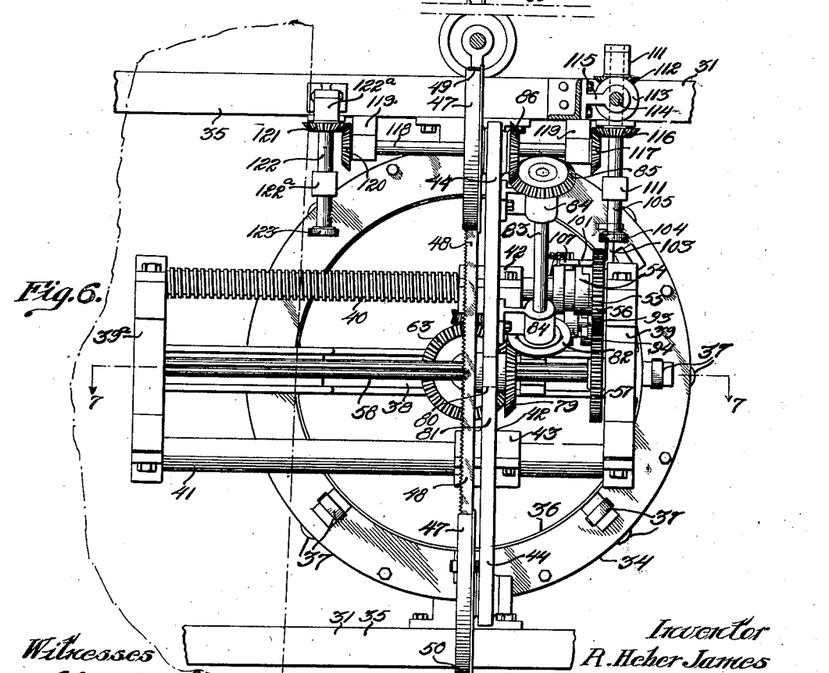
Figure 6 is a section taken on the line 6—6 of Figure 4.

The bearing brackets 39 and 39$^a$ provide bearings for the opposite ends of a rotatable feed screw 40; said brackets also forming a fixed support for a guide bar 41; said guide bar and feed screw being arranged parallel to each other as shown in Figure 6. An internally screw threaded carriage 42 fits the feed screw 40 and includes a portion 43 slidably mounted on the bar 41. The carriage 42 on each side of the unit includes opposed arms 44 which form bearings for shafts 45 and 46 upon which are mounted flanged wheels or pulleys 47 around which passes an endless band saw 48; said band saw being common to both sides of the unit and extending around the wheels 47 on both sides of the unit as clearly shown in Figure 2; the runs 49 and 50 being normally positioned one above the other at the side of the pile 32 with the teeth of the saw opposed to said side of the pile but being normally free of the pile.

Figures 4, 5:
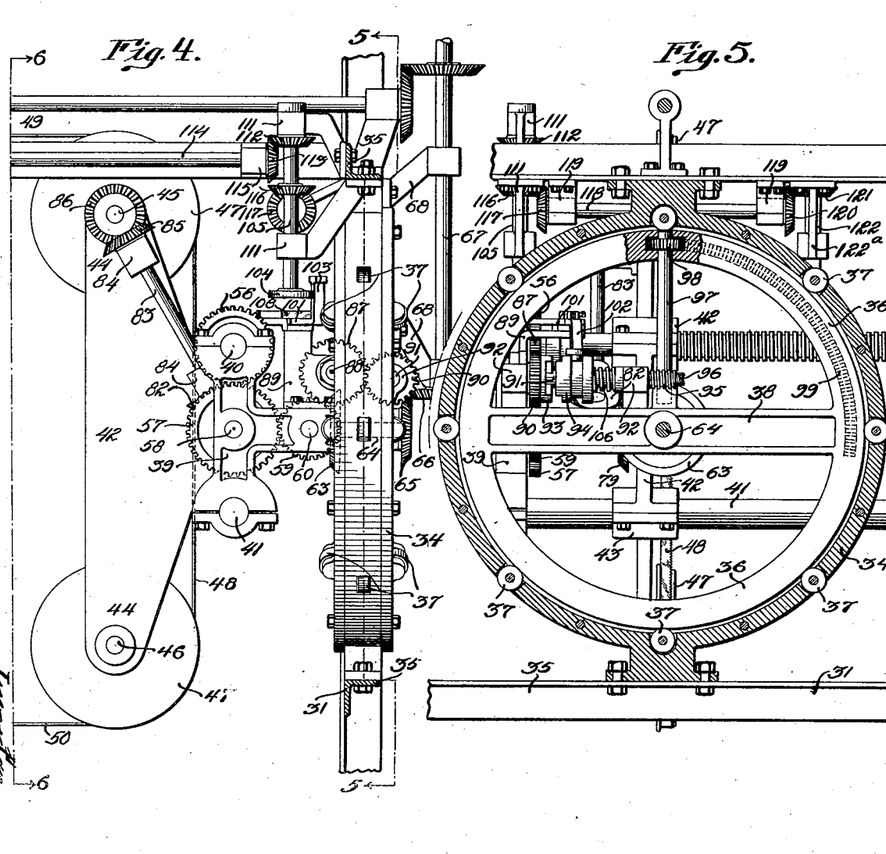
Figure 4 is a section taken on the line 4—4 of Figure 1.
Figure 5 is a section taken on the line 5—5 of Figure 4.
Figures 8, 12, 13, 14, 15, 26, 27, 28, 29:
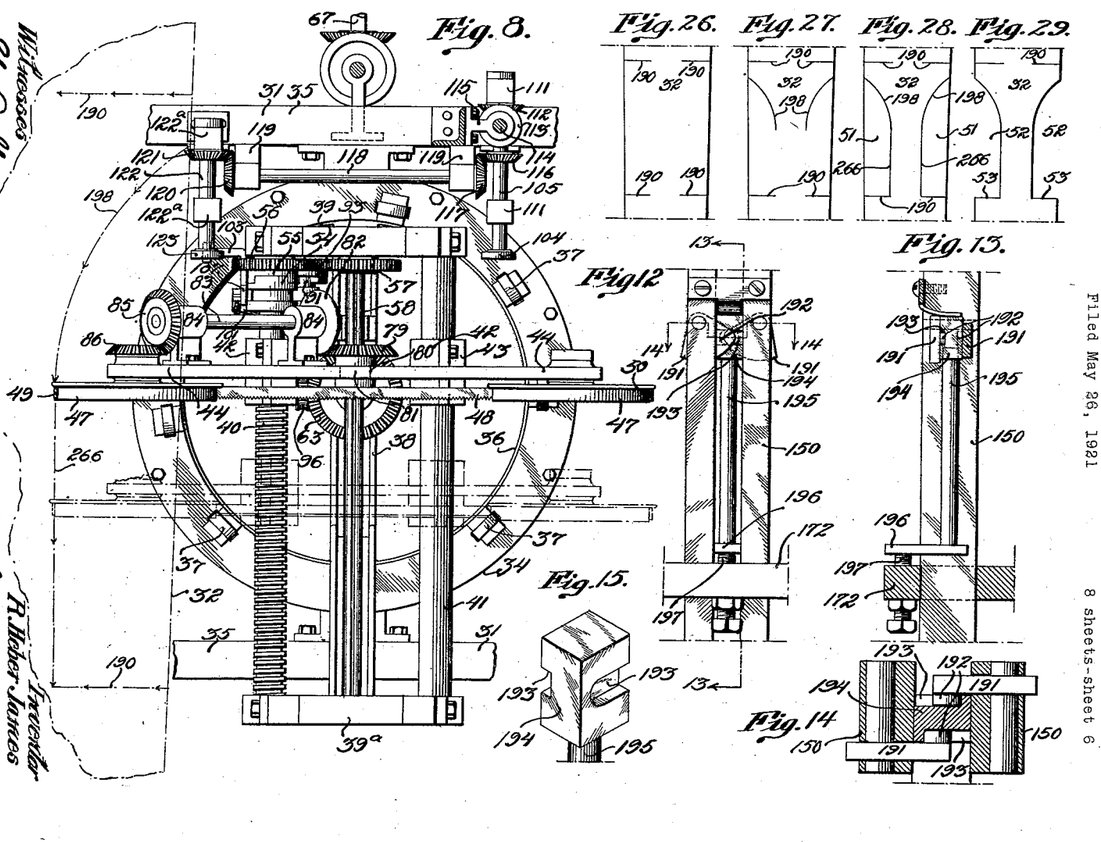
Figure 8 is a view of the same general character as Figure 6 illustrating the parts having been moved into another position which they assume during the cutting of the pile.
Figure 12 is a fragmentary enlarged elevation of one of the releasing tripping structures of the parts illustrated in Figures 9 and 10.
Figure 13 is a section taken on the line 13—13 of Figure 12.
Figure 14 is an enlarged section taken on the line 14—14 of Figure 12.
Figure 15 is an enlarged perspective view of the actuating head of the tripping rod or plunger shown in Figures 12, 13 and 14.
Figures 26, 27, 28 and 29 are fragmentary elevations illustrating diagrammatically the stages of the cut of the pile.

In order to render the following description more comprehensible, it may be here stated that under certain conditions in the forming of the cut that the carrier rings on each side of the unit partially rotate in unison, or in other words move from the position shown in Figure 5 to the position shown in Figure 8 and since the band saw is mounted on structure which is connected to said carrier rings the band saw including the feed screw 40 and the guide bar 41 will also follow this partial rotation of the rings 36. Furthermore in the initial cutting the feed screw rotates while the parts are in the position shown in Figures 4 and 5 to advance both runs of the saw straight into the sides of the pile to form cuts as shown in Figure 26, after which the saw is moved in an opposite direction out of the pile prior to the rotating action of the rings 36, which rotating action will form curved cuts into the pile as shown in Figure 27. While the one run of the saw is still within the pile after making the curved cut, the feed screw is again driven to move the carriage while the carriage is in the position shown in Figure 8 and the saw will then cut downwardly from the curved cut portion to the lower straight line horizontal cut as shown in Figure 28 and a piece of the pile such as shown at 51 in Figure 28 will be removed from the pile to provide a recess 52 and a shoulder 53 as shown in Figure 29. It will be understood that in Figures 26 to 29 inclusive cuts are shown at opposite sides of the pile; said cuts being duplicated owing to the action of both of the units A and B.

Figure 7:
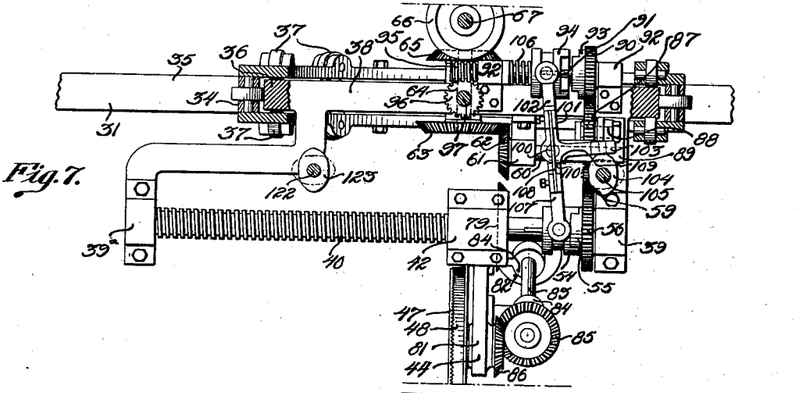
Figure 7 is a fragmentary top plan view partly in section; the section being taken centrally through the supporting structure of Figure 6 on the line 7—7; said view also illustrating in section certain of the cam shafts.

Referring again to the specific construction, the feed screw 40 on each part of the unit receives its rotation through the medium of the following mechanism. A clutch collar 54 is slidably keyed to the cylindrical extension of the feed screw 40 as clearly shown in Figures 6 and 7. This clutch collar, when the feed screw 40 is to operate, engages with a clutch extension 55 on a gear wheel 56. The gear wheel 56 meshes with a gear wheel 57 (see Figure 4) secured on a shaft 58; said shaft 58 being journaled in the bearing brackets 39 and 39$^a$. The gear wheel 57 meshes with a gear wheel 59 on a shaft 60; said shaft being journaled in bearings 61 on the transverse bars 38 of the carrier ring 36. The shaft 60 as shown in Figure 7 has a bevel gear 62 thereon which meshes with another bevel gear 63 on a shaft 64 which is journaled axially within the brace 38. This shaft 64 has a gear wheel 65 thereon which meshes with a bevel gear 66 on an upright shaft 67; said upright shaft being journaled in bearings 68 and 68$^a$ on the carrier housing 34 and frame 31 respectively. The shaft 67 at its top has a bevel gear 69 which meshes with another bevel gear 70 secured to a horizontal shaft 71 which is journaled in bearings 72 on the top of the frame.

The shaft 71 has a gear 73 thereon which meshes with another gear 74 which is freely rotatable at times on a shaft 75; said gear 74 having a clutch engaging face 76. The gear 74 meshes with a gear 77 on the shaft of an electric motor 78. In view of the foregoing drive connection, it will be noted that the motor 78 will transmit power to rotate the feed screws 40 on each part of the unit and the carriage 42 will be moved along the screw according to the direction of rotation of the motor and that the band saw will be moved bodily toward and from the pile. The mechanism which controls the reversing of the motor will be described hereinafter.

The band saw 48 is driven by the following mechanism: A bevel gear 79 has its hub 80 rotatably journaled in an extension 81 of the carriage 42 and is slidably keyed to the shaft 58. Thus the bevel gear 79 is rotated by the shaft 58 but owing to the fact that it is slidably keyed to said shaft it can move along said shaft and follow the movement of the carriage. The bevel gear 79 meshes with a bevel gear 82 which is secured to a shaft 83; said shaft being journaled in bearings 84 which are secured to the carriage 42. The shaft 83 has a bevel gear 85 thereon which meshes with a bevel gear 86 on the shaft 45; said latter shaft having one of the flanged saw pulleys 47 thereon and since the mechanism is duplicated on both parts of the unit the pulleys 47 will be rotated and the band saw will thus be driven. It will be noted that the drive for the saw is independent of the clutch collar 54 and the saw will therefore be driven even though the feed screw 40 is not rotating due to the fact that the clutch collar 54 has been thrown out of engagement with the clutch extension 55 of the gear 56, which action occurs during the making of a cut.

The means for swinging the saw carriages to cause the saw to make the curved portion of the cut, as shown in Figure 27, includes an intermediate gear 87 which is mounted to freely rotate on a stud shaft 88 in a bracket 89 which is secured to the bearing 39 (see Figures 4 to 7). The intermediate gear 87 meshes with a gear 90 which is freely rotatable at times on a shaft 91; said shaft 91 being journaled in bearings 92 on the transverse portion 38 of the carrier ring 36. The gear 90 has a clutch engaging extension 93 adapted to be engaged at times by a clutch collar 94 which is slidably keyed to the shaft 91. The shaft 91 has a worm 95 secured thereon which meshes with a worm wheel 96 secured to a spindle shaft 97; said shaft being rotatably mounted in the ring carrier and having thereon a toothed pinion 98 which is adapted to mesh with the teeth of an arcuate rack 99 formed on the inner surface of the carrier housing 34; this construction being duplicated on both parts of the unit. It will thus be noted that when the clutch collar 94 is in engagement with the clutch extension 93 to rotate the shaft 91 in one direction, the carrier ring 36 on each side of the unit will be partially rotated due to the engagement of the pinions 98 with the rack 99 and the saw carriers will be rotated to cause the upper run of the band saw to cut into the side of the pile; said run of the saw taking an arcuate path to form the curved cut, as shown in Figure 27, after which the feed screw will again be thrown in operation after the parts have been moved into the full line position as shown in Figure 8 and the band saw on its carriage will be moved downwardly into the dot-and-dash line position as shown in Figure 8 to complete the cut as shown in Figure 28. It will be understood that to return the saw to its normal position, the feed screw must be reversed to raise the saw carrier from the dot-and-dash line position shown in Figure 8 to the full line position and then the spindle shaft 97 and shaft 91 must be reversed to return the ring carrier to its normal position and these various movements are automatically effected by mechanism hereinafter described.

Figures 16, 17, 19, 23, 24:
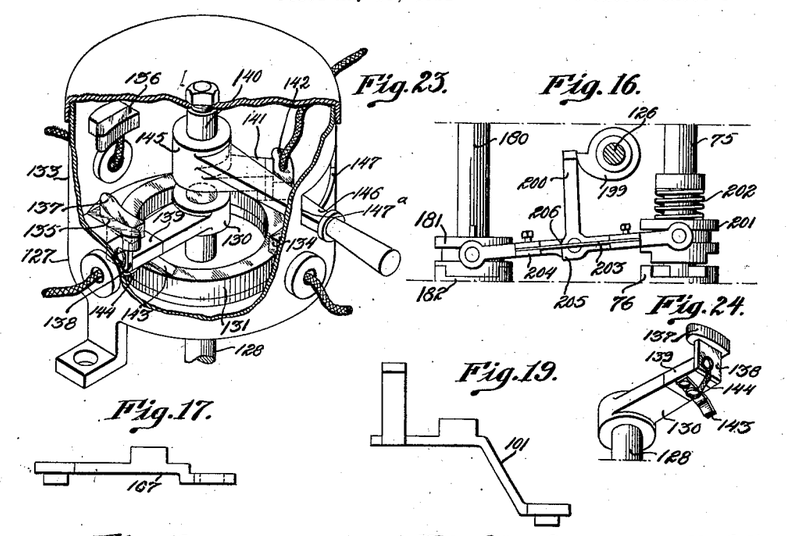
Figures 18, 20, 25, 30, 31, 34:
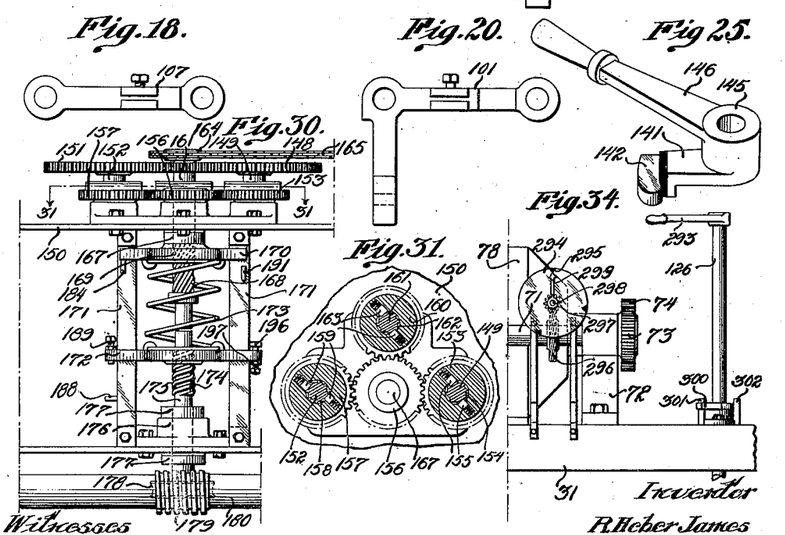

The bracket 89, as clearly shown in Figures 4 and 7, supports a pivot pin 100 upon which is pivotally mounted a bell crank lever 101 shown in detail in Figures 19 and 20. This bell crank lever has an arm 102 for engagement with the clutch collar 94 and another arm 103 adapted to be engaged by a cam 104 on a shaft 105. When the cam is turned into the full line position as shown in Figure 7, the bell crank lever will be rocked to withdraw the clutch collar 94 from the clutch extension 93 and when the cam 104 is moved into the dot-and-dash line position in Figure 7, a spring 106 will move the clutch collar into engagement with the clutch extension 93. A second lever 107 is pivotally mounted on the pin 100 and is attached to the clutch collar 54. A strip spring 108 has portions connected to the lever 107 and to the arm 102 of the bell crank lever 101. The lever 100 has a portion 109 adapted to engage a shoulder 110 on the lever 107 when the lever 101 is moved by the spring 106 so that when the clutch collar 94 is moved into engagement with the clutch extension 93, the clutch collar 54 will be moved out of engagement with the clutch extension 55. When the cam 104 moves the bell crank lever 101 to disengage the clutch collar 94, the clutch collar 54 will be moved into engagement with the clutch extension 55 through the medium of the strip spring 108; thus providing resilient means for moving the clutch collar 54 into engagement with the clutch extension and allowing the clutch collar 54 to engage the extension 55 when the parts of the latter are in their proper positions to receive the clutch extensions of the clutch collar. In other words, if there is a necessity for a slight dwell in the engaging movement of the clutch collar until the extension 55 moves into a position so that the clutch teeth of the collar 54 can engage them, said dwell is allowed by the construction above described.

The shaft 105, which supports the cam 104, is mounted in bearings 111 on the frame 31 and has a bevel gear 112 which is in mesh with a bevel gear 113 on a shaft 114; said shaft 114 being journaled in bearings 115 on the frame. The shaft 105 has another bevel gear 116 thereon which meshes with a bevel gear 117 on a shaft 118; said shaft being journaled in bearings 119 on the frame 31 and having a beveled gear 120 which meshes with a bevel gear 121 on a shaft 122; said shaft being mounted in bearings 122ª on the frame and having a cam 123 thereon which is similar to the cam 104 and is positioned with respect to the bell crank lever 101 so that when the carrier rings are oscillated, for example from the position shown in Figure 6 to the position shown in Figure 8, the arm 103 of the bell crank lever 101 will be positioned so as to be operated by the cam 123. In other words, the cams 104 and 123 serve, under certain conditions, to effect movement of the clutch collars 94 and 54; the cam 104 controlling the movement of said bell crank lever when the saw is making the straight line cut and return to its normal position and to effect the oscillating movement of the carrier rings, and the cam 123 operates to effect the downward and upward movement of the saw carriage.

The shaft 114, as shown in Figure 2, operates the cams 104 and 123 on both parts of the unit and this shaft 114 has a bevel gear 124 which meshes with a bevel gear 125 on a cam-controlling upright shaft 126 which leads upwardly to a position adjacent the top of the cage and receives movement at various times from three controlling units C, D and E which are shown in top plan view in Figure 3 and which are also illustrated in Figures 9, 10, 11, 30 and 31. The switch 127 as shown in Figures 21, 22 and 23, which is mounted adjacent the top of the cage, has an operating shaft 128 upon which is secured a gear wheel 129. The switch 127 includes an arm 130 which is secured to the shaft 128. This arm is adapted to move with respect to a metallic electric ground ring 131 of the switch; said ground ring being in electric connection with any suitable source of electric supply by means of a wire 132 as shown in Figure 22. The switch includes a casing 133 and on the inner surface of this casing are secured three contacts 134, 135 and 136 positioned for successive engagement with a contacting finger 137 on a resilient plate 138; said plate being secured to an insulating portion 139 of the arm 130. A stud shaft 140 has an arm 141 which supports a contact 142 which is similarly constructed to the contacts previously mentioned; said contact 142 being insulated from the portion of the arm 141 which supports it.

The insulating portion 139 of the arm 130 has a metallic shoe 143 which is adapted to engage the ground ring 131. This shoe 143 is connected electrically by a wire 144 to the contacting finger 137. The arm 141 has a hub 145 from which projects an operating hand lever 146. This hand lever extends through a slot 147 in the casing 133 and the hand lever is limited in its movement to the arcuate length of said slot so as to abut the opposite ends of the slot. The various contacts 134, 135, 136 and 142 are connected by wires with any suitable electric source of supply including the ground connection through the medium of the wire 132 and it will be noted that when the contacting finger 137 engages either of the contacts 142 and 135 that the motor will be driven in a forward direction and that when the contacting finger 137 engages either of the contacts 134 or 136 that the motor will be driven in a reverse direction. It will be further noted that the contact 142 is not connected to the casing as are the other contacts but is free to move in an arc equal to the length of the slot 147. This construction is provided to effect the stopping of the motor after the contacting finger has completed a single cycle and has engaged all four of the contacts as will be described hereinafter.

Referring now more particularly to Figures 3, 9, 30 and 31, the gear wheel 129 meshes with a gear wheel 148 on a short shaft 149 mounted in an auxiliary frame 150. This gear wheel 148, as clearly shown in Figure 3, meshes with a gear wheel 151 on a second short shaft 152. The shaft 149 has a gear wheel 153 freely rotatable thereon; said shaft 149 having ratchet teeth 154 adapted to be engaged by spring pressed pawls 155 carried by the wheel 153. The wheel 153 meshes with an intermediate gear wheel 156; said wheel 156 meshing with another gear wheel 157 which is freely rotatable on the shaft 152; said shaft 152 having a ratchet portion 158 adapted to be engaged by spring pressed pawls 159 carried by the wheel 157. The wheel 156 meshes with another gear wheel 160 which is freely rotatable on a shaft 161; said shaft having a ratchet portion 162 adapted to be engaged by spring pressed pawls 163 which are carried by the wheel 160. It will be noted that the teeth on the ratchet portions of the shafts 149 and 152 extend in opposite directions so that a rotatable movement of the wheel 156 in one direction will effect movement of the shaft 149 by its wheel 153 but the wheel 157 will rotate freely on the shaft 152. A reverse movement of the wheel 156 will rotate the shaft 152 through the medium of the wheel 157 but the wheel 153 will rotate freely on the shaft 149. Furthermore, it will be noted that the shaft 161 will only be rotated when the wheel 156, viewed from Figure 31, moves in a clockwise direction.

Figures 9, 10, 11, 21, 22:
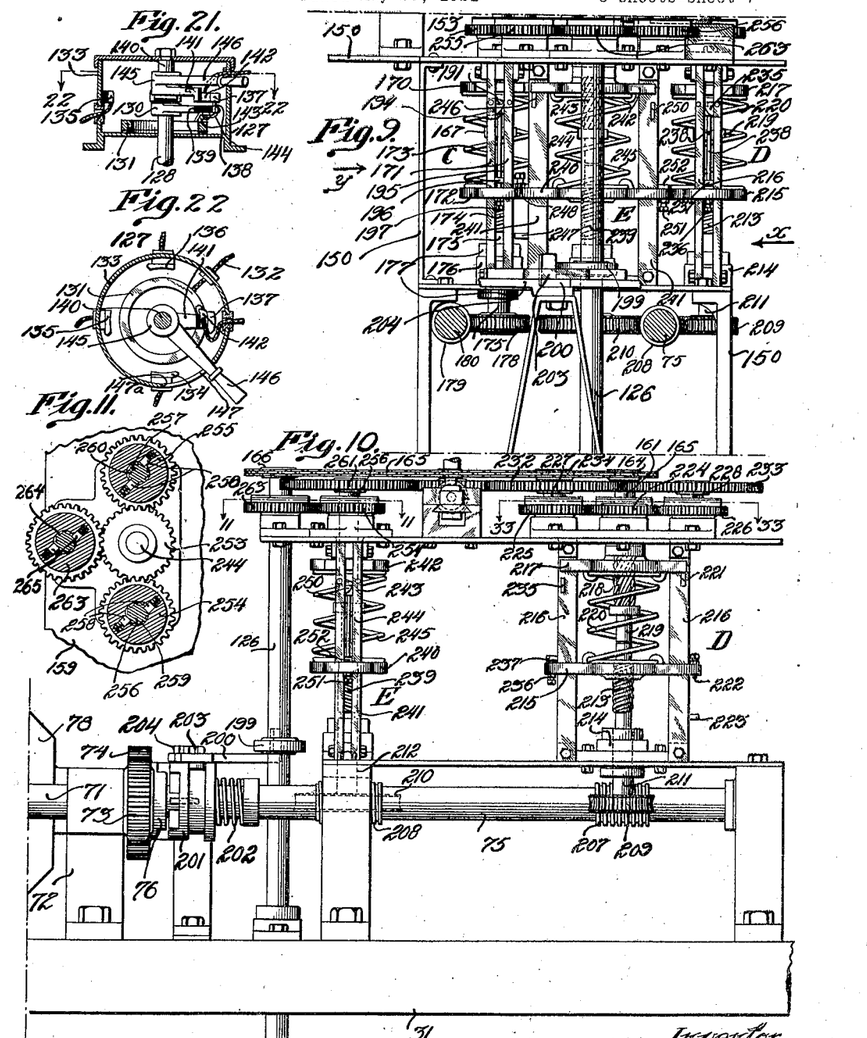
Figure 9 is an enlarged fragmentary sectional elevation taken on the line 9—9 of Figure 3.
Figure 10 is an elevation looking in the direction of the arrow $x$ in Figure 9; the same being an enlarged section taken on the line 10—10 of Figure 3; certain of the parts being omitted.
Figure 11 is a fragmentary section taken on the line 11—11 of Figure 10.
Figure 21 is an elevation partly in section of one of the motor controlling switches.
Figure 22 is a section taken on the line 22—22 of Figure 21.
Figure 32:
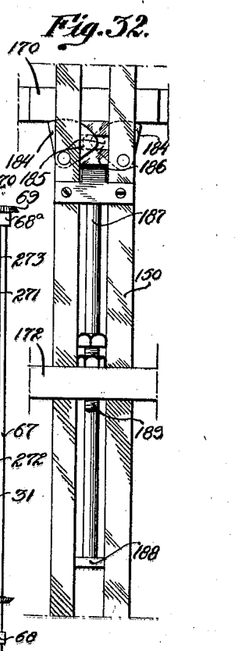
Figure 32 is enlarged fragmentary elevation of a portion of the side of the structure shown in Figure 30.

The shaft 161 has a sprocket wheel 164 secured thereto as shown in Figures 3 and 30 and a chain 165 passes over the sprocket 164 and also over a sprocket 166 on the cam operating shaft 126. Thus it will be noted that when the shaft 161 is operated, the cam operating shaft 126 will be actuated. The intermediate wheel 156 is secured on an upright shaft 167 which has a steep screw threaded portion 168 which fits within a screw threaded hole 169 on a movable plate 170 which is slidably mounted on standards 171 which form a part of the auxiliary frame 150. A second movable plate 172 is also slidably mounted on said standards 171 and is connected with the plate 170 by means of a coiled spring 173. The plate 172 has a screw threaded hole through which extends the screw threaded portion 174 of a shaft 175; said shaft 175 being rotatably mounted in a bearing 176 and is provided with collars 177 to prevent longitudinal movement of said shaft. The lower end of the shaft 175 has a worm wheel 178 secured thereon which meshes with a worm 179 on a shaft 180; said shaft extending parallel with the shaft 75 as shown in Figures 3 and 9. The shaft 180 has a clutch collar 181 adapted at times to be moved into engagement with the clutch extension 182 of a gear wheel 183; said gear wheel being in mesh with the gear wheel 77 on the motor shaft; the clutch collar being slidably keyed to the shaft so that when the clutch collar is in engagement with the extension 182, the shaft 180 will be rotated and thereby effect rotation of the shaft 175 and screw threaded portion 174. The plate 170 is normally held in its raised position, as shown in Figures 30 and 32, by means of pivoted latches 184; said latches having trunnions 185 fitting within a slotted head 186 of a trip rod 187 which is slidably mounted at one side of the auxiliary frame 150 as shown in Figure 32.

The lower end of the trip rod 187 has a foot 188 projecting therefrom which is located in the path of movement of an adjusting screw 189 on the plate 172 since it will be noted that during the rotation of the shaft 175, the screw threaded connection between said shaft and the plate 172 will cause said plate 172 to be lowered and stretch the spring 173. However, since the plate 170 is held by the latches 184 the initial downward movement of the plate 172 will not move the plate 170 downward. When the adjusting screw 189 strikes the foot 188, the trip rod 187 will be moved downwardly and will swing the latches 184 inward and release the plate 170. The tension of the spring 173 will then pull the plate 170 downward, which action will effect a rotation of the shaft 167 and this latter motion will be imparted to the gear wheels 153 and 157 and during this movement the shaft 149 will not be rotated and the shaft 152 will rotate the gear wheel 151 and effect rotation of the wheel 129 and actuate the switch shaft 128, to move the contact finger 137 from the contact 142 to the contact 134 during which action the arm 141 and hand lever 146 will be moved from the position shown in Figure 22 to the position shown in Figure 23. In other words, will move the hand lever 146 until it engages the end 147$^a$ of the slot 147; there being sufficient friction between the contacting finger 137 and the contact 142 to move the arm 141 and the hand lever 146 into said position. During the continued movement of said contacting finger 137 toward the contact 134 it will leave the contact 142 out of its normal position. During the time in which the plate 172 is moving downwardly toward the tripping foot 188, the motor will be rotating forwardly owing to the engagement of the contacting finger 137 with the contact 142 and the feed screw 40 will be rotating in a forward direction on each part of the cutting unit so as to move the saw in a straight path and the saw will cut into the pile to form the straight cuts 190 by the straight runs 49 and 50 of the saw; said straight cuts being shown in Figure 26.

It will be noted however that during said rotation of the shaft 167 that the shaft 161 will not be rotated owing to the direction of movement of the wheel 160 relatively to the shaft since the pawls will merely slip over the teeth of the ratchet portion and will not rotate said shaft 161. During the downward movement of the plate 170 due to the tension of the spring 173, the plate 170 will pass below latches 191 which are pivotally mounted at the opposite side of the auxiliary frame 150 as shown in Figures 9 and 12 to 15 inclusive. These latches have trunnions 192 which fit within grooves 193 in a block 194 which is secured at the upper end of a trip rod 195; said trip rod having a tripping foot 196 adapted to be engaged by an adjusting screw 197 which is carried by the plate 172 when the latter rises during the reverse movement of the shaft 175 which action occurs by the reversing of the motor when the contacting finger 137 moves into engagement with the contact 134 of the switch. During the upward movement of the plate 172, the spring 173 will become compressed owing to the fact that the plate 170 is held in its lowered position due to engagement with the latches 191. Also during the time in which the plate 172 is being raised the feed screw 40 will be rotated in a reverse direction and will withdraw the saw from the straight cuts 190 of the pile.

When the adjusting screw 197 engages the trip foot 196, the trip rod 195 will be raised and the latches will be swung into a position to release the plate 170. The compressed spring 173 will then raise the plate 170 and effect rotation of the shaft 167 in an opposite direction to that which it was rotated by the downward movement of the plate 170 and this reverse movement of the shaft 167 will cause both of the shafts 161 and 149 to be rotated but the shaft 152 is not rotated by the pawls 159. During said action of the shaft 149, its gear wheel 148 will effect movement of the switch shaft 128 through the medium of the wheel 129 and the contacting finger 137 will be moved from out of engagement with the contact 134 into engagement with the contact 135 to again effect the rotation of the motor in a forward direction; said rotation of the shaft 161 will effect a partial rotation of the cam-controlling shaft 126 and this movement will turn the cam 104 into the dot-and-dash line position as shown in Figure 7 and the spring 106 will effect engagement between the clutch collar 94 and the clutch extension 93 and will also effect disengagement of the clutch collar 54 with the clutch extension 55. This action will stop the rotation of the feed screws 40 and will effect an oscillating movement of the carrier rings together with the saw and the upper run 49 of the saw will move in an arc to produce the curved cut 198 in the pile as shown in Figure 27.

During the same movement of the cam-controlling shaft, a cam 199 thereon, as shown in Figures 10 and 16, moves away from a pivoted bell crank lever 200 which is attached to a clutch collar 201 and a spring 202 on the shaft 75 moves the clutch collar 201 into engagement with the clutch face 76 of the gear wheel 74. The bell crank lever 200 is connected similarly to the bell crank lever 101 previously described and a strip spring 203 connects the bell crank lever 200 with another lever 204 which is attached to the clutch collar 181. The lever 200 has a portion 205 adapted to engage a shoulder 206 when the parts are moved by said spring 202 and the clutch collar 181 will be withdrawn from the extension 182 of the gear wheel 183 and thus the shaft 180 will remain idle and the shaft 75 will be rotated.

The controlling units E and D are constructed substantially similar to the unit C above described. The unit E operates at a certain time the switch shaft 128 and the cam shaft 126 as does also the unit C as above described. However, the unit D does not actuate the switch shaft 128 but only actuates the cam shaft 126. With this preliminary description the specific construction and operation of the units D and E can be more thoroughly comprehended.

The shaft 75, as shown in Figure 10, has two worms 207 and 208 which respectively mesh with worm wheels 209 and 210 on upright shafts 211 and 212 of the units D and E. The worm wheel 210 is much larger than the worm wheel 209 so that it is obvious that the shaft 211 of the unit D will rotate at a faster speed than the shaft 212 of the unit E.

Referring now specifically to the unit D and by reference to Figures 9, 10, and 33, the shaft 211 has a threaded portion 213 positioned above the top surface of its bearing 214. A plate 215 is slidably mounted on standards 216 of the auxiliary frame 150 and has a screw threaded hole in which the screw threaded portion 213 of the shaft 211 fits so that upon rotation of the shaft 211 in one direction, the plate 215 will be moved downwardly and it will be noted that under certain conditions the plate 215 will move entirely below the threaded portion 213 so as to remain in its lowered position to form a dwell and for this reason the space is provided between the lower part of the threaded portion 213 and the top of the bearing 214. A reverse movement of the shaft 211 will obviously effect the raising movement of the plate 215. A second plate 217 is slidably mounted on the standards 216 and has a screw threaded hole in which the screw threaded portion 218 of a shaft 219 fits. A coiled spring 220 is secured to the plates 215 and 217. The plate 217 is normally held in its raised position by latches 221 which are similar to the latches 184 described in connection with the unit C and these latches are moved into a position to release the plate 217 when an adjusting screw 222 on the plate 215 engages the tripping foot 223; it being noted that the tripping foot 223 is connected by a trip rod with the latches 221; said trip rod being similar to the rod 187 as shown in Figure 32. Thus it will be noted that during the rotation of the shaft 211, the plate 215 will be lowered and afterwards trip the latches 221 to release the plate 217 and the spring 220 will then lower the plate 217 to partially rotate the shaft 219. The shaft 219 has a gear wheel 224 thereon which meshes with two gear wheels 225 and 226 which are free to rotate on short upright shafts 227 and 228 respectively. These gear wheels carry spring pressed pawls 229 for respective engagement with ratchet portions 230 and 231 of the shafts 227 and 228 as clearly shown in Figure 33; the teeth of said ratchet portions extending in opposite directions on the respective shafts. The shaft 227 has a gear wheel 232 secured thereto which meshes with a gear 233 on the shaft 228. The shaft 227 has a sprocket wheel 234 secured thereto which is in driving connection with the chain 165.

When the plate 217 is lowered as above described it will position itself under latches 235 and will be held in said lowered position during the upward movement of the plate 215 until an adjusting screw 236 on the plate engages a trip foot 237 which is connected to the latches 235 by a trip rod 238 as shown in Figure 9. During this upward movement, the spring 220 will be compressed so that when the latches 235 are released from the plate 217, the latter will be moved upwardly to effect rotation of the shaft 219 in an opposite direction.

Considering now the specific construction of the controlling unit E, the shaft 212 has a threaded portion 239 which fits within a threaded hole in a plate 240 slidably mounted on standards 241 of the auxiliary frame 150. A second plate 242 is slidably mounted on the standards 241 and has a threaded hole through which the threaded portion 243 of a shaft 244 extends. A spring 245 is connected to the plates 240 and 242. The plate 242 is normally held in its raised position by latches 246 as shown in Figure 9; said latches being connected with a trip foot 247 so that when the plate 240 moves downwardly a screw 248 thereon will engage the trip foot 247 in a manner previously described in connection with the other controlling units and thereby release the plate 242 to permit the spring 245 to lower said plate and rotate the shaft 244. The plate 242 is held in its lowered position by latches 250 and is released by the upward movement of the plate 240; said plate 240 carrying an adjusting screw 251 which engages a trip foot 252 which is connected to the latches 250. The plate 242 will then be raised by the spring 245 and the shaft 244 will be rotated in an opposite direction. The shaft 244, as shown in Figure 11, has a gear wheel 253 secured thereto which meshes with two other gear wheels 254 and 255 mounted so as to be free to rotate on short upright shafts 256 and 257. The gear wheels 254 and 255 have spring pressed pawls 258 adapted to engage ratchet portions 259 and 260 of the shafts 256 and 257 respectively; the teeth of said ratchet portions being oppositely disposed on the respective shafts. The shaft 262 has a gear wheel 261 secured thereto which meshes with a gear wheel 262 on the shaft 257. The gear wheel 255 meshes with the gear wheel 129 on the switch shaft 128. The gear wheel 253, as shown in Figure 11, meshes with a gear wheel 263 on the cam-turning shaft 126; said cam-turning shaft having a ratchet portion 264 adapted for engagement with spring pressed pawls 265 carried by the gear wheel 263. Thus when the gear wheel 263 is rotated in one direction the cam shaft will be turned and when rotated in an opposite direction, the spring pressed pawls 265 will merely ride over the ratchet teeth and will not rotate the shaft 126. Thus it will be noted that the cam-turning shaft 126 can be operated by the units C and D through the medium of the chain 165 and can also be directly actuated by the unit E.

Considering the parts are in the position illustrated in Figure 10 and the shaft 75 has started to rotate, which action occurs by the shifting of the clutch collar 201 as above described, the plates 215 and 240 of the units D and E will start to move downwardly but owing to the difference in speed of the shafts 211 and 212, the plate 215 will move downwardly at a greater rate of speed than that of the plate 240. Thus the adjusting screw 222 of the plate 215 will engage the trip foot 223 before the adjusting screw 248 on the plate 240 engages the trip foot 247 and consequently the plate 217 will be released before the releasing movement of the plate 242 and the shaft 219 will be rotated so as to effect movement of the cam shaft 126 through the medium of the chain 165 just at the time when the saw finishes the lower portion of the curved part of the cut in the pile or in other words when the parts have moved into the position shown in Figure 8. This movement of the cam shaft will cause the cam 123, as shown in Figure 8, to actuate the bell crank lever 101 to throw the clutch collar 94 out of engagement with the clutch extension 93 and the clutch collar 54 will again be moved into engagement with the clutch extension 55 and the feed screw 40 will be rotated to move the saw downwardly from its full line position shown in Figure 8. During this action, owing to the slowness of the downward movement of the plate 240, the latter will continue to move downwardly and the plate 215 of the unit D will move below the screw threaded portion 213 of the shaft 211 and the plate 215 will remain in said lowered position during the continued movement of the plate 240 of the unit E. During this continued downward movement of the plate 240 the saw will operate to cut downwardly through the pile along the line 266 as shown in Figures 8 and 28 until the saw reaches the bottom cut 190 in the pile. The parts are so set that when this portion 266 of the cut has been completed the adjusting screw 248 will engage the trip foot 247 and the plate 242 will be released and will be moved downwardly by the spring 245 which action will effect a rotation of the shaft 244 and the switch shaft 128 will be actuated to effect a reverse movement of the motor and the shaft 75 will be rotated in an opposite direction and both of the plates 215 and 240 will start to move upwardly. This reversing action of the motor will also effect a reversing action of the feed screw 40 and the saw will be raised upwardly along the line of the part 266 of the cut. It will be noted that the plate 215 will move upwardly at a greater speed than that of the plate 240 and during this upward movement, the screw 236 will engage the trip foot 237 and thereby effect a release of the plate 217 from under the latches 235 and the spring 220 will move the plate 217 upwardly to effect a reverse movement of the shaft 219 and the cam shaft will be operated to actuate the cam 123 so as to release the bell crank lever 101 and thereby permit the spring 106 to move the clutch collar 94 into engagement with the clutch extension 93 and also move the clutch collar 54 out of engagement with the clutch extension 55. This action will then cause the carrier rings 36 to be partially rotated and the run 49 of the saw will move upwardly in the arcuate line of the part 198 of the cut. Furthermore, after this latter action, the rotation of the shaft 244 will effect movement of the cam shaft 126 to re-set the cams and the switch shaft 128 will be actuated to move the contacting finger 137 off the contact 136 toward the contact 142 but owing to the fact that the contact 142 was previously moved out of its normal position by the contact finger 137 and the hand lever 146 moved into engagement with the end 147ª of the slot 147, the finger 137 will not engage the contact 142 consequently the motor will be stopped and will not start rotating again until the hand lever has been moved toward the opposite end of the slot 147 so as to move the contact 142 into engagement with the contacting finger 137. As a means for securing and positioning the cutting units with respect to the pile before starting the cutting, I provide the following construction.

A supplemental frame 267 includes two bottom channels 268 as shown in Figures 1 and 2 which have pins 269 extending through upright slots 270 in the main frame 31; these channels being positioned adjacent opposite sides of said main frame; there also being two upper bars 271 which are in pin and slot connection with the frame 31; the bars 271 and the channels 268 being connected by upright channels 272. Screw threaded posts 273 which are secured to the bars 271 extend upwardly through bearings and are in engagement with internally screw threaded hubs 274 of bevel gears 275; said bevel gears being freely rotatable in bearings 276 secured to the main frame 31; the arrangement being such that said hubs 274 have no longitudinal movement. The bevel gears on opposite sides of the main frame have gear connections so as to be coupled one with the other and one of said bevel gears has a hand wheel 277 secured thereto so that it can be turned and will consequently effect the turning of the other bevel gear through its connection. It is obvious that when the bevel gears are turned the main and supplemental frames will be moved with respect to each other. Two clamping bars 278 have their opposite ends slidable within the channels 268 and are positioned adjacent opposite sides of the pile when the frame 31 is positioned over the pile as shown in Figures 1 and 2. These clamping bars are in linked connection with the lower arms 279 of bell crank levers 280; pivoted on brackets 281 supported on the channels 268. The upper arms 282 of the bell crank lever are slotted to receive a pin 283 on a rod 284. The pivots 283ª of the bell crank levers are in the form of rods and these rods at positions adjacent the opposite side of the frame have arms 279ª which are in lined connection with the clamping bars 278 as shown in Figure 2. The rod 284 extends upwardly and at its top is screw threaded; said screw threaded portion extending through a screw threaded hub of a hand wheel 285 which is supported on a bracket 286 which is secured to one of the uprights 272 of the supplemental frame. Thus by turning the hand wheel the clamping bars 278 can be moved into clamping engagement with the sides of the pile to secure the supplemental frame to the pile and by turning the hand wheel 277 the main frame can be moved to position its cutting units at any height desired.

As a means for leveling the main frame, I provide a number of guiding members 287 and slidably mount therein toothed racks 288 having pile-engaging shoes 289 which are spaced apart within the circumference of the pile and are adapted to be moved into engagement with the pile through the medium of pinions 290 which mesh with the teeth of the racks 288; said pinions 290 being rotatable by rods 291 having hand wheels 292 adjacent the upper portion of the frame 31 so that they can be independently operated and due to pressure against the pile, the frame can be moved so that the top will be level. If desired I may use any suitable level gages (not illustrated) on the top of the frame 31 to determine when the frame has assumed a level position. With my improved device the cage or frame 31 can be lowered over a pile which is to be cut and can be secured thereto in a proper position. By knowing the distance between the cutting units and the upper portion of the main frame, the cage can be positioned so that even though the cutting units are under water they can be set and operated to produce the cut at the proper level. It is merely necessary, when the automatic control is employed, for a workman after the frame is properly adjusted to push the hand lever 146 from the position shown in Figure 23 to the position shown in Figure 22 and no further manual operation is necessary until the entire cut has been made and it is again desired to form another cut.

If it is desired to dispense with the automatic controlling units C, D and E, the cam shaft 126 can be operated by hand and, in Figure 34, I have shown an arrangement whereby this manual operation can be accomplished and it will be noted that when this action is done by hand that any simple switch can be used for controlling the forward and reverse movement of the motor. With this construction I have illustrated a hand lever 293 which is secured to the cam-controlling shaft 126 so that the shaft 126 can be rotated a quarter revolution in either direction as required for changing the positions of the cams with the construction illustrated. A dial 294 has notches 295 or other indicating parts on its face. A worm 296 is secured on the drive shaft 71 and meshes with a worm wheel 297 on a shaft 298. An indicator pointer 299 is secured to the shaft 298 and is adapted to traverse the dial during the rotation of the shaft 71. A limiting finger or projection 300 is secured to the shaft 126 and is adapted to abut either of two stops 301 and 302 so as to limit the turning movement of the shaft 126 to a quarter turn. During the operation with this manual control the operator starts the motor and then watches the indicating pointer 299 and when it reaches the next notch 295 the operator stops the motor and moves the shaft 126 by the hand lever 293 a quarter turn to change the position of the cams. The motor is then started and the action is repeated until the complete cut is made.

With the form of band saw as illustrated in the various views of the drawing it will be noted that in the first inward movement of the saw that two cuts 190 are produced, one by each run of the saw. However, in forming the recesses only the lower cut forms a part as shown.

If desired non-corrosive material can be used in forming parts of my improved device which are adapted to be submerged in the water and in view of the fact that the parts can be kept thoroughly lubricated there is comparatively little chance of injury to the parts by the action of the water.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. Mechanism for cutting recesses including means for making a straight cut and automatically operative means for making a curved cut merging into a substantially straight cut, connecting with the inner edge of the first cut, thereby forming a shouldered recess.

2. Mechanism for cutting opposed recesses including means for concurrently making opposed straight cuts and automatically operative means for concurrently making curved cuts merging into substantially straight cuts, connecting with the inner edges of the first cuts, thereby forming opposed shouldered recesses.

3. Mechanism for cutting recesses in piles including means for making a horizontal cut; automatically operative means for making a curved cut merging into a substantially vertical cut connecting with the inner part of the first cut, thereby forming a shouldered recess, and means for supporting the cutting mechanism on a pile.

4. Mechanism for cutting recesses in piles including means for making a horizontal cut; automatically operative means for making a curved cut merging into a substantially vertical cut connecting with the inner part of the first cut, thereby forming a shouldered recess, and adjustable means for supporting the cutting mechanism on a pile.

5. Mechanism for cutting recesses including power driven means for making a straight cut and automatically operative means for making a curved cut merging into a substantially straight cut, connecting with the inner edge of the first cut, thereby forming a shouldered recess.

6. Mechanism for cutting opposed recesses including power driven means for concurrently making opposed straight cuts and automatically operative means for concurrently making curved cuts merging into substantially straight cuts, connecting with the inner edges of the first cuts, thereby forming opposed shouldered recesses.

7. Mechanism of the character described including a cutting member, a rotatable support therefor, means for imparting motion to the cutting member, power driven means for imparting rotary motion to the support, power driven means for moving the cutting member on its supports independently of its rotary movement, and automatic means for alternating the rotary movement and the independent movement whereby the cutting unit will first move in a curved path and then in another direction.

8. Mechanism of the character described including a cutting member, a rotatable support therefor, means for imparting motion to the cutting member, power driven means for imparting rotary motion to the support, power driven means for moving the cutting member radially upon its supports and automatic means for alternating the rotary movement and the radial movement whereby the cutting unit will first move in a curved path and then in a path tangential to the curve.

9. Mechanism of the character described including a cutting member, a rotatable support therefor, means for imparting motion to the cutting member, power driven means for imparting rotary motion to the support, power driven means for moving the cutting member radially upon its supports, common driving means for imparting the rotary and the radial movements of the support, and means for alternating coupling the common driving means with the means for imparting rotary movement and the means for imparting radial movement to the support.

10. In mechanism of the character described, a carriage, a rotatable support mounted on the carriage, a cutting member mounted on the support, means for rotating the support, a feed screw mounted on the support at right angles to its axis, and in threaded connection with the carriage, common driving means for rotating the support and actuating the feed screw, and means for alternately coupling the common driving means with the feed screw and the means for rotating the support.

11. A pile cutting machine including a frame; carriages movably mounted therein; a band saw mounted thereon; power driven means for imparting a traveling movement to the band saw; automatically operated means for moving the carriages in the direction of the pile, and automatically operated means for moving the carriages in reverse direction.

12. A pile cutting machine including a frame; carriages movably mounted therein; a band saw mounted thereon; power driven means for imparting a traveling movement to the band saw; automatically operated means for moving the carriages in the direction of the pile; automatically operated means for moving the carriages in reverse direction, and automatically operated means for moving the carriages vertically.

13. A pile cutting machine including a frame, movable carriages, rotatable supports for the carriages, a band saw mounted on the carriages, means for imparting a traveling movement to the band saw and means for imparting rotary movement to the carriage supports.

14. A pile cutting machine including a frame, movable carriages, rotatable supports for the carriages a band saw mounted on the carriages, means for imparting a traveling movement to the band saw and means for imparting vertical movement to the carriage supports.

15. A pile cutting machine including a frame, movable carriages, rotatable supports for the carriages, a band saw mounted on the carriages, means for imparting a traveling movement to the band saw, and means for imparting a rotary movement and then a vertical movement to the carriage supports.

16. A pile cutting machine including a frame, movable carriages, rotatable supports for the carriages, a band saw mounted on the carriages and having parallel runs, means for imparting a traveling movement to the band saw, means for moving the carriages in the direction of the pile to produce a horizontal cut, means for reversing said movement, means for moving the carriages vertically, and means for imparting rotary movement to the carriage supports.

17. A pile cutting machine including a frame, movable carriages, rotatable supports for the carriages, a band saw mounted on the carriages and having parallel runs, means for imparting a traveling movement to the band saw, means for moving the carriages in the direction of the pile to produce a horizontal cut, means for reversing said movement, means for moving the carriages vertically, and means for imparting vertical movement to the carriage supports.

18. A pile cutting machine including a frame, movable carriages, rotatable supports for the carriages, a band saw mounted on the carriage and having parallel runs, means for imparting a traveling movement to the band saw, means for moving the carriages in the direction of the pile to produce a horizontal cut, means for reversing said movement, means for moving the carriages vertically, and means for imparting rotary and then vertical movement to the carriage supports.

19. Mechanism of the character described including a rotatable supporting member, a carriage movable thereon, a cutting member mounted on the carriage, a feed screw mounted on the support at right angles to its axis of rotation and in threaded connection with the carriage, a driving shaft, power driven means for actuating the feed screw and rotating the support, and automatic means for connecting the driving shaft and the feed screw to impart horizontal movement to the carriage, for reversing the motion, for disconnecting the feed screw and connecting the drive shaft with the rotating means, for disconnecting the rotating means and connecting the feed screw, for reversing the motion of the feed screw, for disconnecting the feed screw and connecting the rotating means.

20. Mechanism of the character described including a rotatable supporting member, a carriage movable thereon, a cutting member mounted on the carriage, a feed screw mounted on the support at right angles to its axis of rotation and in threaded connection with the carriage, a driving shaft, power driven means for actuating the feed screw and rotating the support, a clutch member having driving connection with the feed screw, a clutch member having driving connection with the rotatable support, levers connected to the clutch members and cams controlling the levers and arranged to automatically cause a clutch to actuate the rotating means and a clutch to engage the feed screw as the sequence of operations require.

21. A pile cutting machine including a frame, carrier housings mounted therein and in axial alignment, carrier rings rotatably mounted in the housings, brackets carried by the rings, a feed screw mounted in the brackets, a guide bar supported by the brackets parallel to the feed screw, a carriage in threaded connection with the feed screw and slidably connected with the guide bar, pairs of opposed arms on the carriages, a shaft carried by each pair of arms, a wheel on each end of the shafts, a band saw carried by the wheels, means for actuating the band saw, means for actuating the feed screw and means for rotating the carrier rings.

22. Mechanism of the character described including a rotatable supporting member, a carriage movable thereon, a cutting member mounted on the carriage, a feed screw mounted on the support at right angles to its axis of rotation and in threaded connection with the carriage, power driven means for rotating the support and actuating the feed screw, a driving shaft, a clutch member having driving connection with the support, a clutch member having driving connection with the fed screw, levers carried by the clutch member, cams adapted to actuate the levers, and connections whereby movement of the rotatable member transfers the control of the levers from one cam to another.

23. A device of the character described including a main supporting frame; cutting means thereon; a supplemental frame; clamping means on the supplemental frame; means for moving the clamping means into engagement with a member to be cut whereby the supplemental frame is secured to said member; and means adjustably connecting the main frame with the supplemental frame whereby the main and supplemental frames may be vertically adjusted with respect to each other to change the position of said cutting means with respect to said member.

24. A device of the character described including a main supporting frame; cutting means thereon; a supplemental frame; clamping means on the supplemental frame; means for moving said clamping means into engagement with a member to be cut whereby the supplemental frame is secured to said member; means adjustably connecting said main frame with said supplemental frame whereby the main and supplemental frames can be adjusted with respect to each other to change the position of said cutting means with respect to said member; and means carried by said main frame for abutment with said member whereby said frame can be moved into a level position; substantially as described.

25. A device of the character described including a main supporting frame; cutting means thereon; a supplemental frame; clamping means on the supplemental frame; means for moving said clamping means into engagement with a member to be cut whereby the supplemental frame is secured to said member; means adjustably connecting said main frame with said supplemental frame whereby the main and supplemental frames can be adjusted with respect to each other to change the position of said cutting means with respect to said member; means carried by said main frame for abutment with said member whereby said frame can be moved into a level position, said latter means including guideways supported by said main frame; toothed racks having shoes for engagement with the member to be cut; pinions for engagement with said toothed racks; and means for rotating said pinions; substantially as described.

26. A device of the character described including a main supporting frame; cutting means thereon; a supplemental frame; clamping means on the supplemental frame; means for moving said clamping means into engagement with a member to be cut whereby the supplemental frame is secured to said member; means adjustably connecting said main frame with said supplemental frame whereby the main and supplemental frames can be adjusted with respect to each other to change the position of said cutting means with respect to said member; and means carried by said main frame for abutment with said member whereby said frame can be moved into a level position; substantially as described.

27. Mechanism for cutting recesses including a supporting frame, a motor, a band saw and automatic means for advancing the saw to make a straight cut, retracting the saw, advancing and guiding the saw to make a curved cut merging into a substantially straight cut, and for returning the saw to its starting position.

28. Mechanism for cutting recesses including a supporting frame, a motor, a band saw and automatic means for advancing the saw to make a straight cut, retracting the saw, advancing and guiding the saw to make a curved cut merging into a substantially straight cut, for returning the saw to its starting position, and for stopping the motor.

29. Mechanism for cutting recesses including a supporting frame, a motor, a band saw and automatic means for advancing the saw to make a straight cut, reversing the motor to withdraw the saw, reversing the motor and advancing and guiding the saw to make a curved cut merging into a substantially straight cut, reversing the motor and returning the saw to its starting position.

30. Mechanism for cutting recesses including a supporting frame, a motor, a band saw and automatic means for advancing the saw to make a straight cut, reversing the motor to withdraw the saw, reversing the motor and advancing and guiding the saw to make a curved cut merging into a substantially straight cut, reversing the motor and returning the saw to its starting position, and for stopping the motor.

31. Automatic cutting mechanism, adapted to make a series of cuts, including a motor; a band saw; a source of electric supply; a series of electric contacts; an arm secured to the switch shaft and carrying a contact movable relatively to the other contacts; connections whereby engagement of the movable contact with other contacts will close a circuit which will reverse the motor; tripping mechanism, and gearing connecting the tripping mechanism with the switch lever whereby the movable contact may be successively engaged with other contacts thereby reversing the motor after one cut is made, again reversing it after the saw is withdrawn, and again reversing it after a second cut is made.

32. Automatic cutting mechanism, adapted to make a series of cuts, including a motor; a band saw; a source of electric supply; a series of electric contacts; an arm secured to the switch shaft and carrying a contact movable relatively to the other contacts; connections whereby engagement of the movable contact with other contacts will close a circuit which will reverse the motor; tripping mechanism; gearing connecting the tripping mechanism with the switch lever whereby the movable contact may be successively engaged with other contacts thereby reversing the motor after one cut is made, again reversing it after the saw is withdrawn, again reversing it after a second cut is made, and whereby the movable contact may be disengaged from contact after the cycle of operations is completed thereby automatically stopping the motor.

In testimony whereof I have signed my name to this specification in the presence of two subscribing witnesses.

REGINALD HEBER JAMES.

Witnesses:
ELIZABETH GARBE,
CHAS. E. POTTS.